United States Patent
Padhi et al.

(10) Patent No.: US 11,506,806 B2
(45) Date of Patent: Nov. 22, 2022

(54) BOREHOLE SEISMIC WAVEFIELD DATA SEPARATION

(71) Applicant: Halliburton Energy Services, Inc., Houston, TX (US)

(72) Inventors: Amit Padhi, Houston, TX (US); Kary Darnell Green, Cypress, TX (US); Jose David Carrillo Rangel, Katy, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 16/650,841

(22) PCT Filed: Jun. 13, 2019

(86) PCT No.: PCT/US2019/036919
§ 371 (c)(1),
(2) Date: Mar. 25, 2020

(87) PCT Pub. No.: WO2020/251576
PCT Pub. Date: Dec. 17, 2020

(65) Prior Publication Data
US 2021/0396898 A1    Dec. 23, 2021

(51) Int. Cl.
*G01V 1/28*    (2006.01)
*G01V 1/50*    (2006.01)

(52) U.S. Cl.
CPC ............. *G01V 1/284* (2013.01); *G01V 1/50* (2013.01); *G01V 2210/161* (2013.01)

(58) Field of Classification Search
CPC . G01V 1/42; G01V 1/284; G01V 1/50; G01V 2210/161
See application file for complete search history.

(56) References Cited

U.S. PATENT DOCUMENTS 7,660,194 B2 *  2/2010  Uhl .................. G01V 1/008
                                                    367/55
2012/0269035 A1   10/2012  Foley
(Continued)

OTHER PUBLICATIONS

PCT Application Serial No. PCT/US2019/036919, International Search Report, dated Mar. 5, 2019, 3 pages.
(Continued)

*Primary Examiner* — Elias Desta
(74) *Attorney, Agent, or Firm* — Delizio, Peacock, Lewin & Guerra

(57) ABSTRACT

A seismic source is positioned at the surface of a geologic formation and a plurality of seismic receivers is positioned in a wellbore of the geologic formation. Seismic wavefield data is obtained based on the seismic source outputting seismic energy into the wellbore and the plurality of seismic receivers receiving the seismic energy. A velocity profile is determined along the wellbore based on the seismic wavefield data. P and S wave data in a downgoing direction is separated from the seismic wavefield data based on an inversion and the velocity profile. The P and S wave data in the downgoing direction is adaptively subtracted from the seismic wavefield data to form residual wavefield data. The P and S wave data in a upgoing direction is separated from the residual wavefield data based on the inversion and an updated velocity profile. The P and S wave data in the upgoing and downgoing direction is output.

20 Claims, 10 Drawing Sheets

(56) References Cited

U.S. PATENT DOCUMENTS

| | | |
|---|---|---|
| 2015/0073714 A1 | 3/2015 | Foy |
| 2015/0338536 A1 | 11/2015 | Bale |
| 2016/0178772 A1 | 6/2016 | Carter |
| 2017/0269247 A1 | 9/2017 | Poole et al. |
| 2021/0103063 A1* | 4/2021 | Padhi .................. G01V 1/30 |

OTHER PUBLICATIONS

PCT Application Serial No. PCT/US2019/036919, International Written Opinion, dated Mar. 5, 2019, 7 pages.

Dragoset, "Geophysical Applications of Adaptive-Noise Cancellation", SEG Technical Program Expanded Abstracts, 1995, pp. 1389-1392.

Esmersoy, "Inversion of P and SV Waves From Multicomponent Offset Vertical Seismic Profiles", GEOPHYSICS, vol. 55, No. 1 (Jan. 1990); p. 39-50.

Leaney, et al., "Parametric Wavefield Decomposition and Applications", SEG Technical Program Expanded Abstracts, 1990, pp. 1097-1100.

Rickett, et al., "Adaptive Multiple Subtraction With Non-Stationary Helical Shaping Filters", EAGE 63rd Conference & Technical Exhibition, Amsterdam, The Netherlands, Jun. 2001, 4 pages.

* cited by examiner

400

BOREHOLE SEISMIC WAVEFIELD DATA SEPARATION

TECHNICAL FIELD

The disclosure generally relates to the field of earth or rock drilling (mining), and more particularly to separation of seismic wavefield data collected in a borehole of a geologic formation.

BACKGROUND ART

Structural imaging and reservoir characterization facilitate drilling for hydrocarbons and other fluids in a geologic formation. Structural imaging involves determining presence of seismic reflectors in the geologic formation indicative of particular types of rocks in the geologic formation. Reservoir characterization involves determining a lithology and/or presence of hydrocarbons and other fluids in the geologic formation. The types of rocks, lithology, and/or presence of hydrocarbons and other fluids in the geologic formation influence a drilling direction in the geologic formation.

Seismic wavefield data is used to image the geologic formation and characterize reservoirs in the geologic formation. The seismic wavefield data is generated by lowering one or more geophones into a wellbore, sending out energy from a source located at the surface of the Earth, and receiving, by the one or more geophone, resulting seismic waves indicative of the seismic wavefield data. The seismic wavefield data includes upgoing and downgoing P and S waves among other wave modes. The P wave stands for pressure waves (as it is formed from alternating compressions of rock) in a direction of travel within the rock. The S waves stands for secondary waves, or shear waves which moves as a shear or transverse wave, so motion is perpendicular to the direction of travel of the P wave within the rock. The upgoing P and S waves include those waves traveling upwards in a geologic formation having a positive slope and the downgoing P and S waves include those waves traveling downward in the geologic formation having a negative slope, or vice versa depending on convention. The seismic wavefield data received by the one or more geophones do not distinguish between the upgoing and downgoing P and S wave data. The upgoing and downgoing P and S wave data need to be separated from the seismic wavefield data in order to accurately image the geological formation and characterize a reservoir in the geologic formation.

BRIEF DESCRIPTION OF THE DRAWINGS

Embodiments of the disclosure may be better understood by referencing the accompanying drawings.

Figure 1:
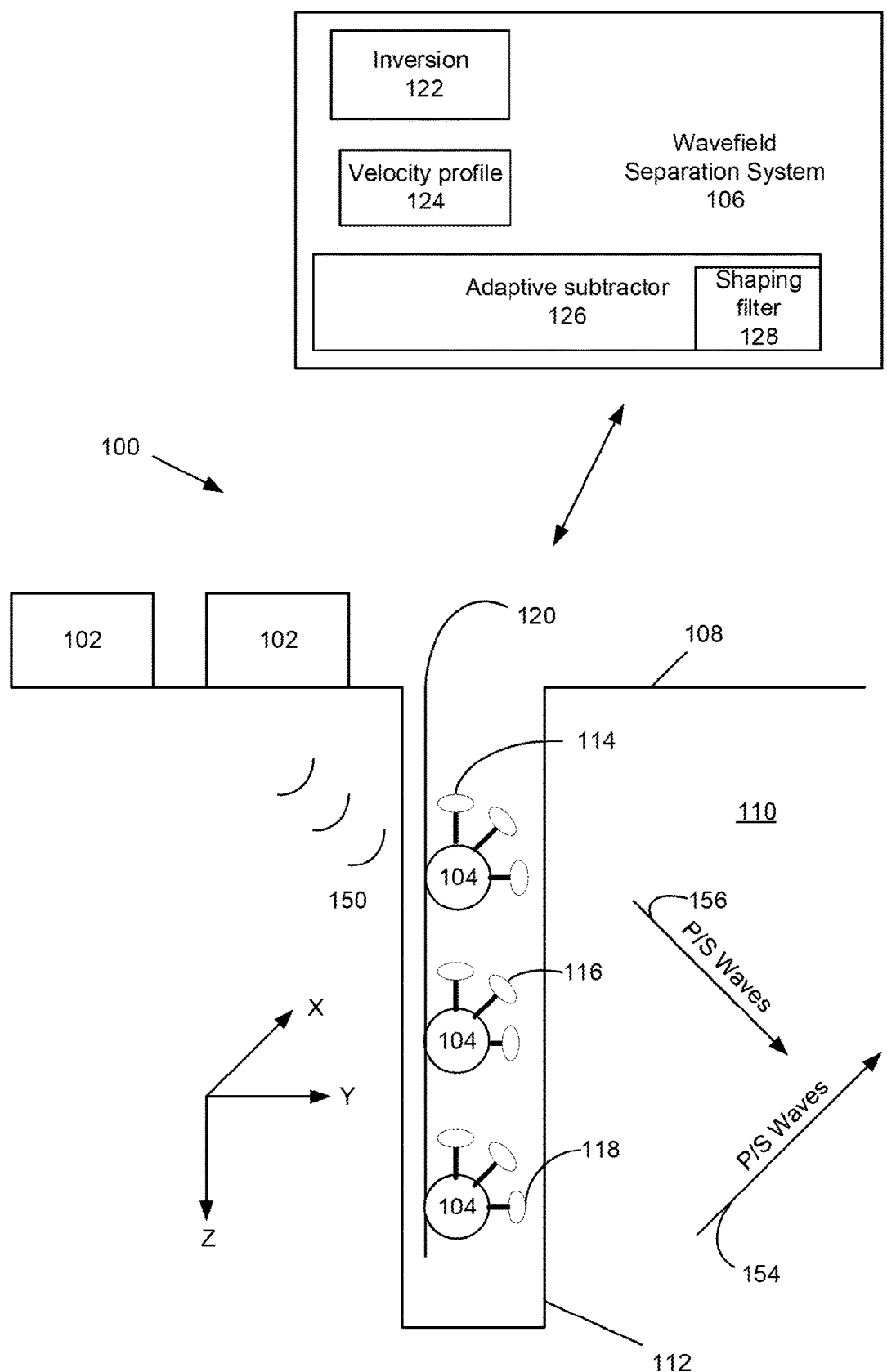
FIG. 1 illustrates an example system associated with performing a seismic survey of a geologic formation.

The drawings are for purpose of illustrating example embodiments, but it is understood that the inventions are not limited to the arrangements and instrumentalities shown in the drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to collecting seismic wavefield data in a borehole of a geologic formation and separating the seismic wavefield data into P and S wave data in an upgoing and downgoing direction. Embodiments of this disclosure can instead be used for separation of wavefields in data other than seismic wavefield data. In other instances, well-known instruction instances, protocols, structures and techniques have not been shown in detail in order not to obfuscate the description.

Overview

Parametric wavefield separation (PWS) is typically used to separate seismic wavefield data into upgoing and downgoing P and S wave data when the geologic formation is structurally simple. In parametric wavefield separation, a two-step inversion is used to separate the seismic wavefield data into the upgoing and downgoing P and S wave data. A complex geological formation includes subsurface reflectors, a deviated well trajectory, and/or rock with varying velocity structures. As geometry of the geological formation becomes more complex, the parametric wavefield separation process generates artifacts. The artifacts take the form of downgoing P and S wave data in the upgoing P and S wave data, among other artifacts.

Embodiments described herein are directed to an improved wavefield separation for separating the seismic wavefield data into the upgoing and downgoing P and S wave data that works well in presence of complex subsurface geometry.

The improved wavefield separation begins with obtaining seismic wavefield data. At least one seismic source located at a surface of the Earth and/or below the surface will output seismic energy and one or more seismic receivers located along a wellbore in the geologic formation will receive resulting seismic waves. The seismic receiver has a plurality of geophones oriented in different directions, including the horizontal and vertical directions to receive seismic waves in the horizontal and/or vertical direction. The vertical direction may be in a direction along the wellbore while the horizontal direction may be in a direction normal to the direction along the wellbore.

The seismic receiver is positioned in the wellbore suspended by a conveyance. The seismic receiver can receive the seismic energy from the seismic source, e.g., shot, and generate data. The data collectively generated by each geophone of the seismic receiver is referred to as seismic wavefield data. The seismic wavefield data includes the seismic energy received by each geophone in the vertical and horizontal direction. Further, the geophones may be oriented in given azimuthal directions in a horizontal plane. To facilitate subsequent wavefield separation, the seismic wavefield data associated with the seismic energy received by each geophone in the horizontal direction is mathematically rotated toward a direction of the seismic source.

The seismic wavefield data (which is rotated) includes the upgoing and downgoing P and S wave data. A velocity profile is used to separate out the wave modes. The velocity profile maps out the layers of rock in a monitoring region and the expected speed that seismic waves (P waves, S waves, including anisotropic effects) will travel in each layer. The velocity profile is determined by measuring a time for a seismic wave to travel a known depth distance from the seismic source to the seismic receiver in the wellbore. In one or more examples, the slope of the wellbore may vary, e.g., have a plurality of local slopes. To determine velocities near the wellbore when the well is deviated, a time is measured for a seismic wave along a slope of the wellbore to travel a known distance along the local slope of the wellbore. The local velocity can then be calculated based on the time and known distance.

The seismic wavefield data is also divided into time windows. The seismic wavefield data is collected for a period of time. The time window is less than the period of time. The seismic wavefield data associated with the time window is separated into the upgoing and downgoing P and S wave data. The seismic wavefield data in the time window has less wave modes compared the seismic wavefield data in the period of time resulting in more reliable identification of the upgoing and downgoing P and S wave data.

A first inversion scheme uses the velocity profile and an L1 norm to separate the downgoing P and S wave data from seismic wavefield data. The downgoing P and S wave data output by the first inversion scheme are scalars (e.g., magnitudes) of an amplitude of the P and S wave data. The scalars are mathematically rotated to determine components of the P and S wave data in the horizontal and vertical directions. Then, the rotated downgoing P and S wave data is adaptively subtracted from the seismic wavefield data which was rotated. The adaptive subtraction involves shaping the rotated downgoing P and S wave data prior to subtraction from the seismic wavefield data using shaping filters based on a least squares algorithm. In a simplest, form, a shaping filter is estimated based on a least squares fitting between the rotated downgoing P and S wave data and the seismic wavefield data which was also rotated, making the filter and subsequent subtraction adaptive. The shaping reduces energy from those rotated downgoing P and S wave data in a residual dataset after the subtraction.

A second inversion scheme is then used to generate the upgoing wave modes based on this residual in a manner similar to the first inversion scheme. The first inversion scheme outputs an updated velocity profile. This updated velocity profile is used with the second inversion scheme to determine the upgoing P and S wave data. This process can be repeated for the different time windows to determine the upgoing and downgoing P and S wave data for seismic wavefield data in each of the time windows of the period of time Additionally, this process can be repeated different locations of seismic sources with respect to seismic receivers. Advantageously, the use of one or more of the velocity profile during the inversion scheme, L1 norm, and adaptive subtraction allows for separation of the P and S wave data from the seismic wavefield data while reducing an amount of artifacts. The artifacts include downgoing P and S wave data in the upgoing P and S wave data, and vice versa.

The description that follows includes example systems, apparatuses, and methods that embody aspects of the disclosure. However, it is understood that this disclosure may be practiced without these specific details. In other instances, well-known structures and techniques have not been shown in detail in order not to obfuscate the description.

Example Illustrations

FIG. 1 illustrates an example system 100 associated with performing a seismic survey of a geologic formation. The seismic survey estimates properties of the geologic formation, including various rock types, properties, and/or their location beneath the Earth's surface.

The example system 100 includes one or more seismic sources 102, one or more seismic receivers 104, and a wavefield separation system 106. The seismic source 102 may be located at a surface 108 of a geologic formation 110 (as shown) or below the surface 108 (e.g., 100 ft). The seismic receiver 104 may be located in a wellbore 112 of the geologic formation. The wellbore 112 is also known as a borehole in the art.

The seismic source 102 generates controlled seismic energy 150 used to perform the seismic surveys. The seismic source 102 can be as simple as an explosion such as produced by dynamite, or it can use more sophisticated technology, such as a specialized air gun, a seismic vibrator (e.g., vibroseis), and other technologies which inject acoustic energy into the Earth's subsurface. The seismic source 102 can output single pulses or continuous sweeps of energy, e.g., shots, with known frequency, phase, and/or amplitude which travel through a medium such as water or layers of rocks.

The seismic receiver 104 may receive the seismic waves 150 generated by the seismic source 102. The seismic receiver 104 may be positioned downhole in the wellbore 112 suspended by a conveyance 120 such as a wireline. Besides a wireline, as depicted, other conveyance types may be used for positioning the seismic receiver into wellbore, including coiled tubing, wired drill pipe, slickline, and downhole tractor, for example. In one or more examples, the seismic receiver 104 may include one or more geophones 114-118. The geophone may be an electronic receiver designed to pick up seismic vibrations on or below the Earth's surface 108 and convert the seismic vibrations into electric impulses that are proportional to the displacement, velocity, and/or acceleration of ground movement. The geophone may be oriented in a given direction, vibrate when seismic energy is received in the given direction, and convert the vibration into the electrical signal. The direction may include a vertical direction or horizontal direction. The vertical direction may be referred to as a Z direction along the wellbore 112 while the horizontal direction may be referred to as an X or Y direction normal to the direction along the wellbore 112. In this regard, geophones are usually organized in groups of at least three, each oriented at different angles, so that a three-dimensional record of ground movement can be obtained. As an example, geophone 114 and geophone 116 are shown as oriented in a horizontal direction while geophone 118 is oriented in a vertical direction. The group of at least three geophones 114-118 may be fixed with respect to each other to form the seismic receiver 104. Further, the geophones may be oriented in given azimuthal directions in the wellbore in a horizontal plane defined by the X and Y directions.

The data (e.g., shot gathers) associated with the seismic waves 150 received by a plurality of geophones may be referred to as seismic wavefield data. The seismic wavefield data produced as result of the seismic energy 150 may include P waves and S wave data. The P wave stands for pressure waves (as it is formed from alternating compressions of rock) or primary waves in a direction of travel within the rock. The S waves stands for shear waves which moves as a shear or transverse wave, so motion is perpendicular to the direction of travel of the P wave within the rock. The upgoing P and S waves 154 include those waves traveling upwards in a geologic formation toward the surface and having a positive slope and the downgoing P and S 156 include those waves traveling downward away from the surface of the geologic formation and having a negative slope. The choice of slope representing up and down going waves are a matter of convention and the directions, defined by slope, may be alternatively applied.

As the seismic receiver 104 is downhole, various communication schemes including acoustic telemetry, electromagnetic or radio frequencies style communication, modulation of pressure flow, among others may be used to send the seismic wavefield data from the seismic receiver 104 to the wavefield separation system 106. The wavefield separation system 106 may be located at the surface (as shown) or downhole. The wavefield separation system 106 may receive the seismic wavefield data and separate the seismic wavefield data into upgoing and downgoing P and S wave data. The wavefield separation system 106 may include an inversion 122, a velocity profile 124, and adaptive subtractor 126 with shaping filter 128 to reliably separate the seismic wavefield data into the upgoing and downgoing P and S wave data.

Example Operations

Figure 2:
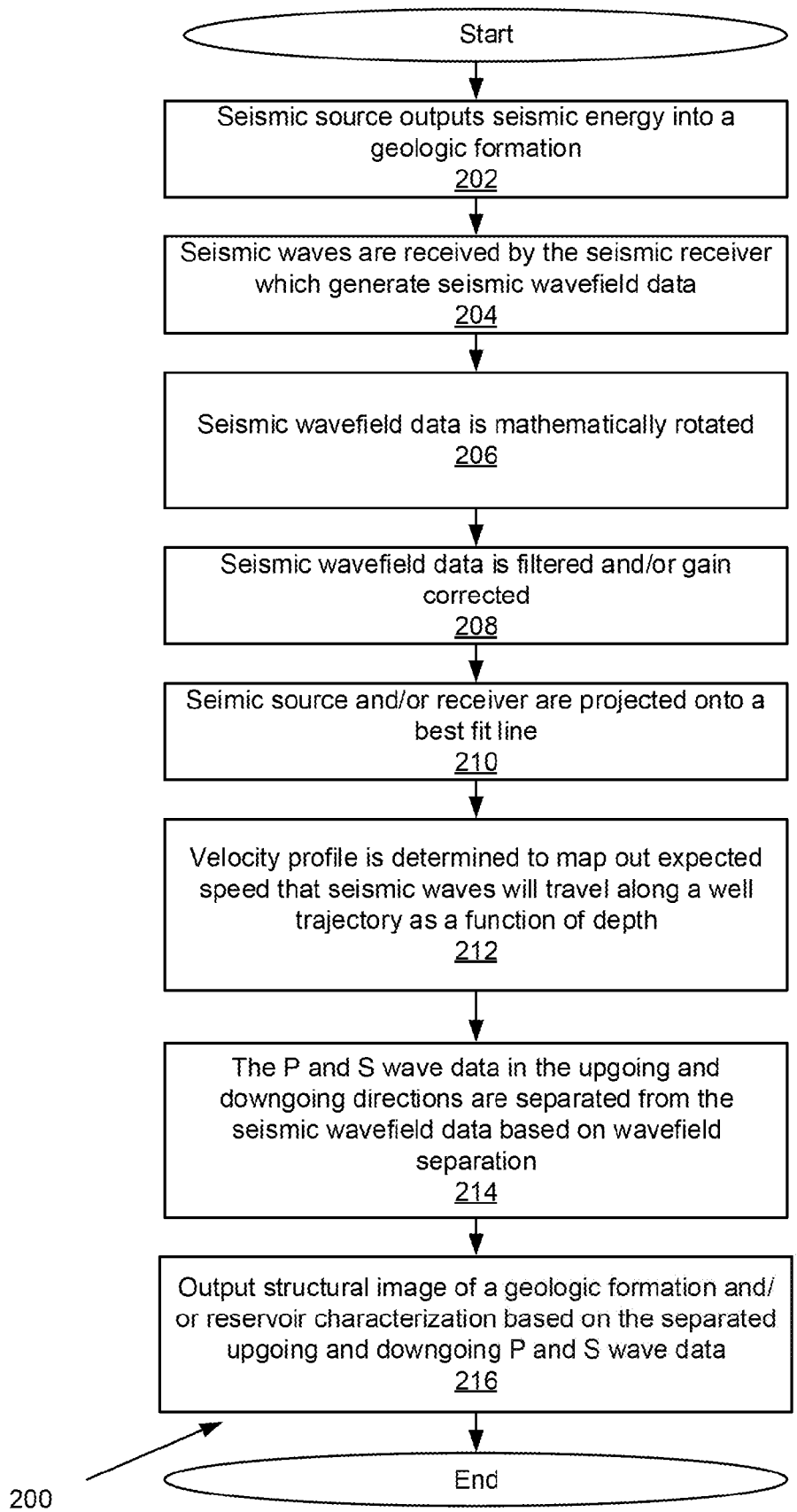
FIG. 2 is an example flow chart of functions associated with decomposing seismic wavefield data from the seismic survey into upgoing and downgoing P and S wave data.

FIG. 2 is an example flow chart of functions 200 associated with separating the seismic wavefield data from the seismic survey into the upgoing and downgoing P and S wave data.

At 202, the seismic source (e.g., source 102) outputs seismic energy into the geologic formation. The seismic source may be located at a surface of the Earth and direct the seismic energy into the Earth toward the one or more seismic receivers. (e.g., receivers 104). At 204, seismic waves may be received by one or more seismic receivers and generate seismic wavefield data indicative of the seismic waves. The one or more seismic receivers may take the form of geophones placed in a plurality of spatial locations along the wellbore (e.g. as described in FIG. 1).

The seismic source may be offset with respect to each seismic receiver. In a zero offset, the seismic source is oriented substantially in a direction of the seismic receiver. An example of the zero offset may be the seismic receiver being located downhole in a vertical well with the seismic source located at a wellhead. Most energy output by the seismic source is directed toward the seismic receiver. An example of a non-zero offset may be when the seismic source is oriented at a non-zero angle with respect to the seismic receiver. The downgoing energy travels at an angle with respect to the seismic receiver such that only a portion of the energy output by the seismic source is directed toward the seismic receiver.

A plurality of seismic receivers may be positioned in the wellbore via the conveyance. Further, one horizontal geophone of one seismic receiver may be oriented at a given azimuth in the horizontal plane different from another horizontal geophone of another seismic receiver. In this regard, the geophones may be oriented in given azimuthal directions in the horizontal plane.

At 206, the seismic wavefield data from at least one of geophone oriented in the horizontal direction is mathematically rotated towards a direction of maximum seismic energy, which in one or more examples is a direction of the seismic source. The rotated seismic wavefield data indicate a response of the geophone if oriented in the direction of the seismic source. A rotation matrix may be applied to the seismic wavefield data to rotate it in the direction of the seismic source. Subsequent processing of the seismic waveform data described below may be performed on the rotated seismic wavefield data even though the seismic waveform data may not be explicitly referred to as being rotated.

Figure 3:
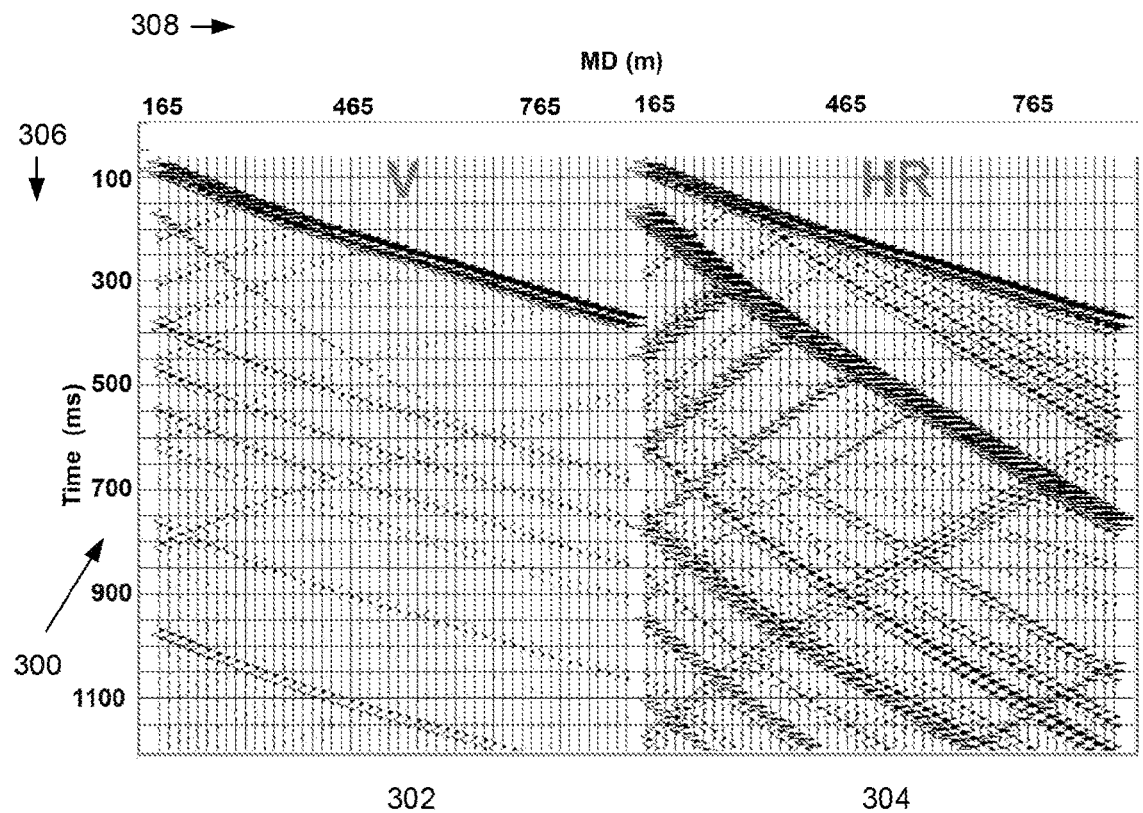
FIG. 3 illustrate example representations of the seismic wavefield data collected from one or more receiver stations.

FIG. 3 illustrate example representations 300 of the seismic wavefield data. The representation 302 shows the seismic wavefield data associated with geophones oriented a vertical direction (V) in the wellbore as a function of time on a vertical axis 306 and measured depth 308 on a horizontal axis. The representation 304 shows the seismic wavefield data associated with geophones oriented in a horizontal direction (HR) in the wellbore. The seismic wavefield data may comprise a plurality of wave modes, including the upgoing and downgoing P and S wave data.

At 208, the seismic wavefield data may be filtered and/or gain corrected. The filtering may improve a signal to noise ratio of the seismic wavefield data by removing data associated with instrument vibrations and/or noise which masks arrival of P and S wave data at the seismic receiver and amplifying the P and S wave data. The filtering may take the form of a bandpass filter or other signal processing methods.

The seismic survey includes seismic sources and seismic receivers located in a three-dimensional space. In one or more examples, an indication of position of the seismic source and/or seismic receiver may be converted from three dimensions to two dimensions to reduce computational complexity of the wavefield separation. To perform this conversion, at 210, the seismic source and/or receiver may be projected onto a best fit line. The best fit line may a line or several line segments between the seismic source and seismic receiver that best represents the spatial positions of the seismic receiver and seismic source. This line may pass through some of the spatial positions of the seismic source and seismic receiver, none of the spatial positions, or all of the spatial positions. Various methods including least squares or regression methods may be used to determine this best fit line. The methods may minimize a perpendicular distance between each of the seismic source and seismic receiver. A position of the seismic source and seismic receiver may be projected into this best fit line. In this regard, the seismic source and receiver may be located along the best fit line and located in two-dimensional coordinates rather than three dimensional coordinates in the geologic formation. The two-dimensional coordinates may be a position along the line (indicative of a well trajectory) and a measured depth in the geologic formation rather than three dimensional coordinates which would increase processing complexity, computation time, and/or memory requirements of the wavefield separation process.

At 212, a velocity profile is determined to map out expected speed that seismic waves will travel along the well trajectory as a function of measured depth. The geologic formation is composed of sedimentary rock formed through deposition over time. Layers of rock are created from different materials or under varying conditions and naturally each layer of rock will have different properties. Speed of travel may vary depending on which layers of rock the seismic waves travel through. A velocity profile maps out the layers of rock in a monitoring region and the expected speed that seismic waves (P-waves, S-waves, including anisotropic effects) will travel in each layer. The velocity profile may be determined based on first breaks, a slope of a trajectory of the wellbore, and the seismic wavefield data.

The first breaks is an earliest arrival of seismic waves at a seismic receiver in the wellbore resulting from seismic energy output by a seismic source at the surface of the geologic formation. The seismic source may be near to the seismic receiver, e.g., within 50 meters. The velocity may be calculated by measuring a time for the seismic waves to travel a known depth distance from the seismic source to the seismic receiver. In one or more examples, the slope of the wellbore may vary, e.g., have a plurality of local slopes. If the wellbore is not strictly vertical, e.g., deviated, then the velocity profile may be derived based on first breaks of seismic waves in a direction along the slope of the wellbore (e.g., tangential to the wellbore). For example, first arrival travel times based on seismic energy output by the seismic source can be noted by two geophones oriented tangentially to the wellbore at different locations in the wellbore. A difference in travel times of the first breaks to two geophones and the distance between the geophones indicates the local velocity along the well (i.e., velocity at a given location). This process may be repeated for the plurality of local slopes along the wellbore to determine the local velocity profile near the wellbore which are then combined together to form the velocity profile.

Figure 4:
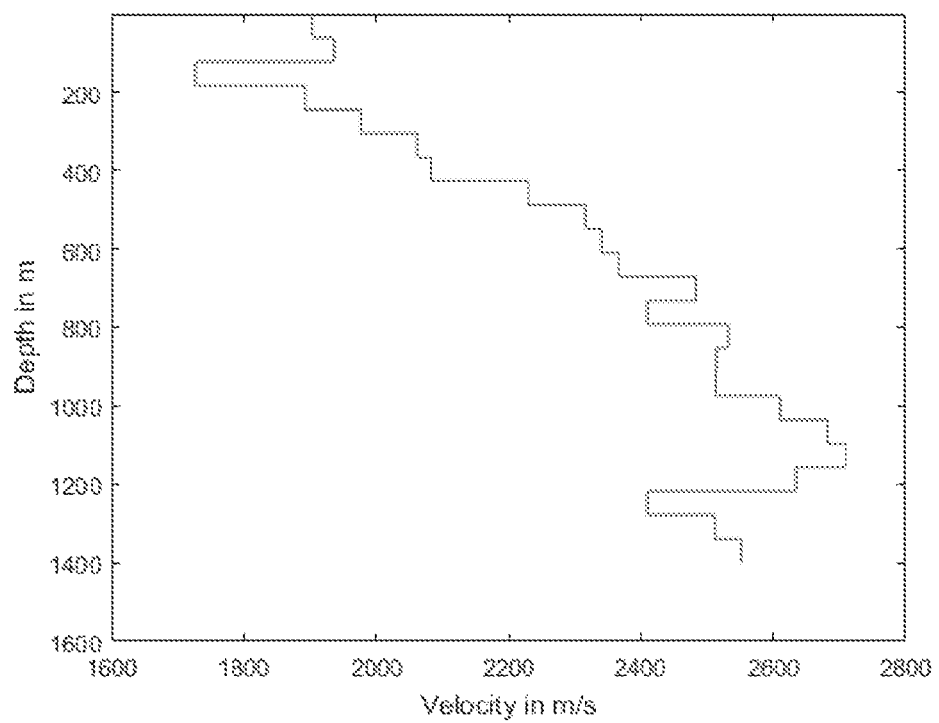
FIG. 4 illustrates an example velocity profile.

FIG. 4 is an example of a velocity profile 400 for a vertical well. The velocity profile 400 indicates a velocity of seismic waves as a function of measured depth. The velocity profile 400 may take other forms depending on a nature of the wellbore and geologic formation.

At 214, the downgoing P and S wave data is separated from the seismic wavefield data based on a modified version of Parametric Wavefield Separation (PWS).

Figure 5:
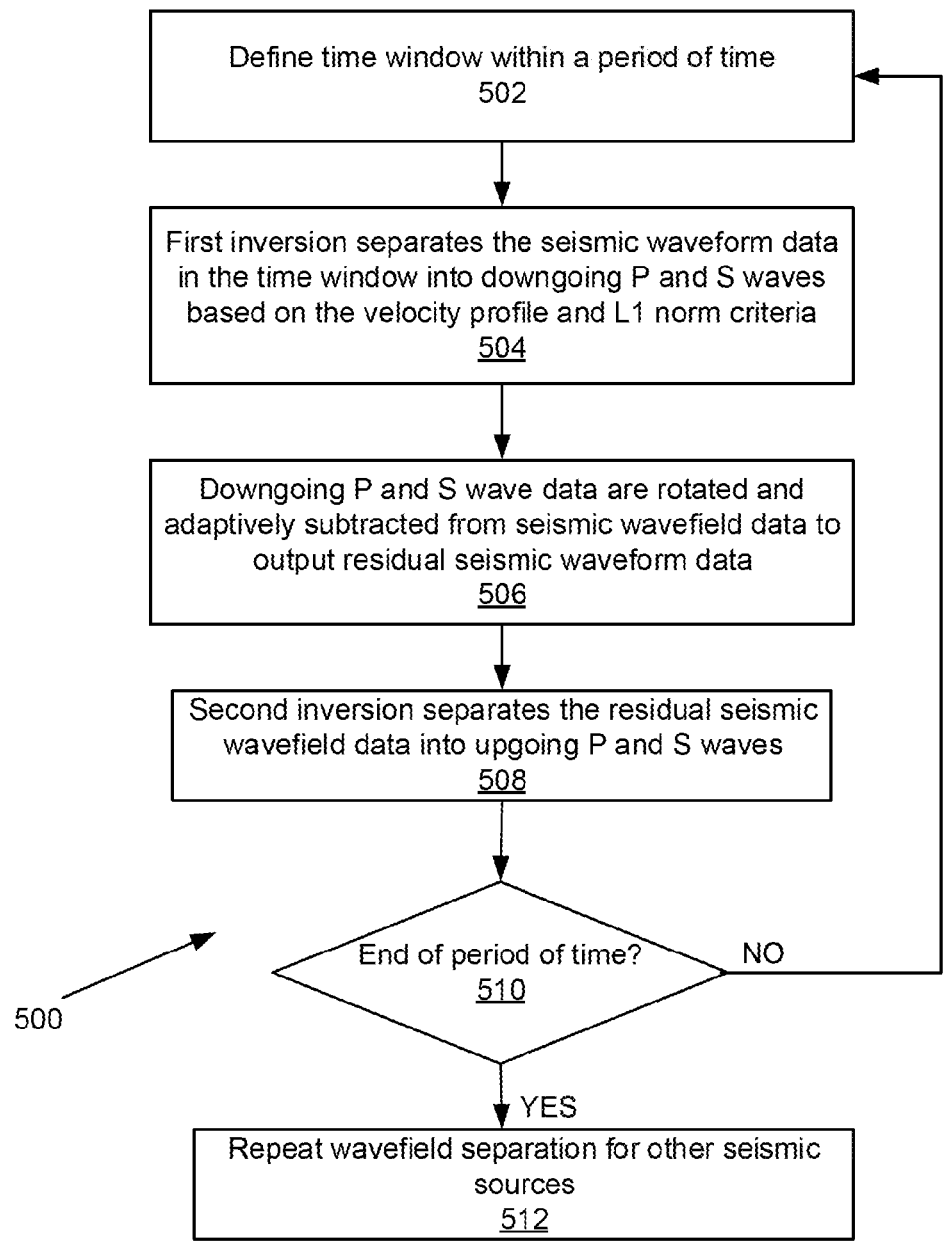
FIG. 5 is another example flow chart of functions associated with decomposing the seismic wavefield data from the seismic survey into the upgoing and downgoing P and S wave data.

FIG. 5 is a flow chart 500 of functions associated with decomposing the seismic wavefield data from the seismic survey into the upgoing and downgoing P and S wave data. The seismic wavefield data may be associated with a plurality of seismic receivers, e.g., a window of 12 geophones, and a seismic source near to the plurality of seismic receivers, e.g., within 50 meters. The wavefield separation may involve a two-step process of first determining the downgoing P and S wave data from the seismic wavefield data and then a separate step of determining the upgoing P and S wave data.

The seismic wavefield data may be collected over a period of time. At 502, a time window may be defined. The time window may be a duration less than the period of time. The time window may be 100 ms or some other period of time which reduces a number of wave modes to separate during the time window compared to the period of time. In some examples, the time window may be equal to the period of time in which case the number of wave modes to separate out is not reduced.

At 504, an inversion scheme is used to decompose the seismic wavefield data in the time window into the downgoing P and S wave data based on the velocity profile and L norm criteria.

Figure 6:
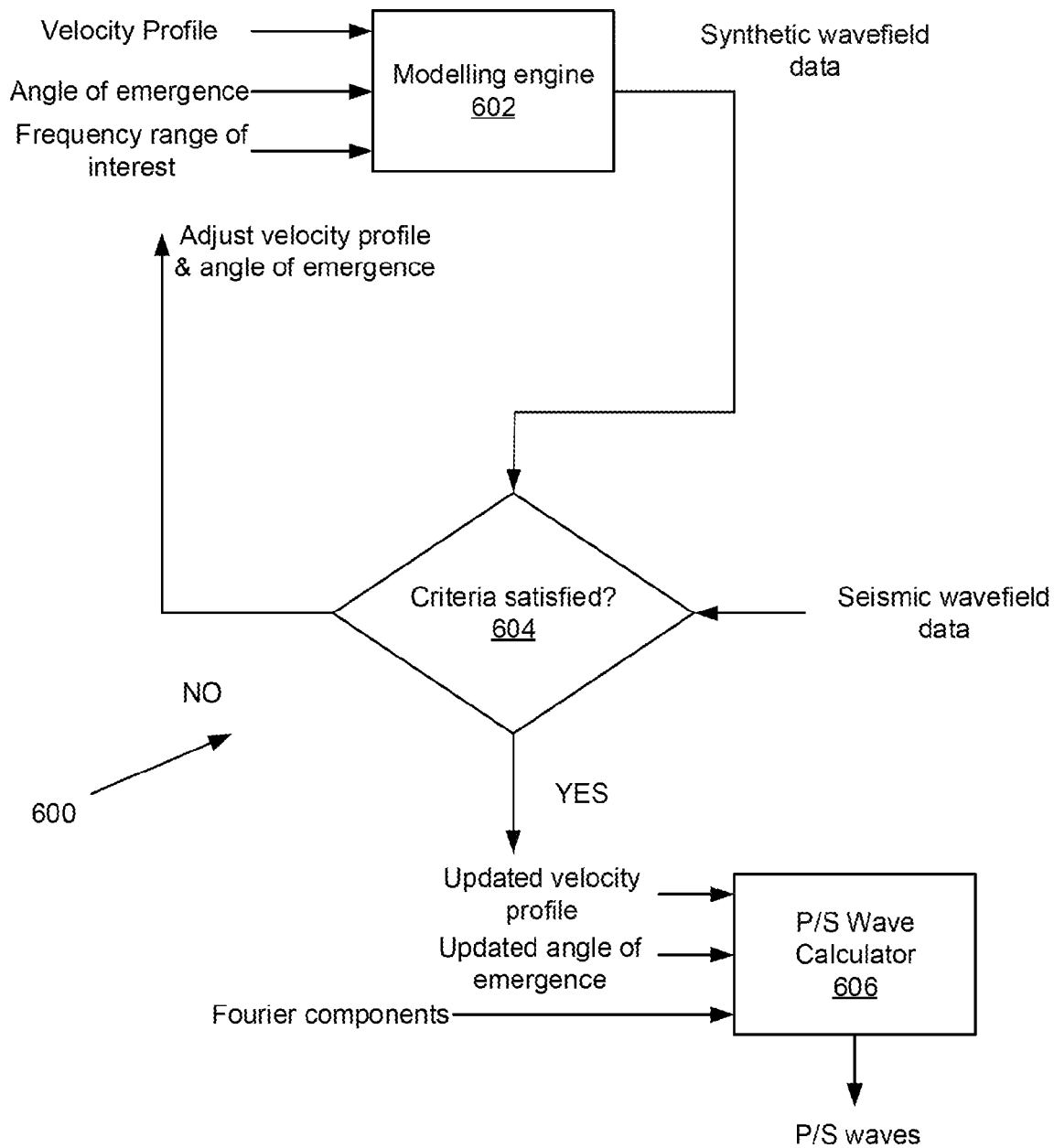
FIG. 6 is a block diagram of an example inversion scheme.

FIG. 6 is a block diagram of this inversion scheme 600. A modeling engine 602 (e.g., forward modeling engine) takes as input the velocity profile, estimates of angles of emergence of the seismic energy, and frequencies of the seismic wavefield data of interest and outputs synthetic wavefield data. In one or more examples, the velocity profile, estimates of angles of emergence, and/or more generally a property of the geologic formation such as density is characterized as a model which describe properties of the geologic formation. The angle of emergence refers to an angle of a seismic ray from vertical (or some other reference) which hits the seismic receiver. A positive angle of emergence may indicate a downgoing ray and a negative angle of emergence would indicate an upgoing ray (or vice versa). The ray is a path along which seismic energy travels from the energy source outwards. The synthetic wavefield data is an estimate of the seismic wavefield data which would be collected by the receiver window based on the inputs in the geologic formation. The synthetic wavefield data may be compared to the seismic wavefield data collected by the receiver window. If the synthetic wavefield data and the actual seismic wavefield data in the receiver window meet criteria, then the synthetic wavefield data and the actual seismic wavefield data in the receiver window match. The criteria 604 may be an error metric such as L1 norm or other criteria. The L norm calculates an absolute value of a difference between the synthetic wavefield data and the seismic wavefield data meeting a threshold level. If the criteria is not met, then one or more of the velocity profile and/or angles of emergence may be iteratively updated until the criteria is met. Optimizations associated with the iterative adjustment may include limited memory Broyden-Fletcher-Goldfarb-Shanno (L-BFGS). The frequencies of the seismic wavefield data of interest include Fourier components of the seismic energy that reach the seismic receiver. The downgoing P and S wave data is then calculated as a function of the velocity profile and angles of emergence (positive or negative, whichever is indicative of downgoing P and S wave data) meeting the criteria and the Fourier components associated with the frequencies of the seismic wavefield data of interest. A P/S wave calculator 606 defines this function which outputs the downgoing P and S wave data.

The inversion scheme 600 may be performed in a time domain, frequency domain, or a combination of the time domain and frequency domain. If the inversion scheme 600 is performed in the frequency domain, then the actual seismic wavefield data in the time domain may be converted into the frequency domain via a Fourier transform for comparison with the synthetic wavefield data in the frequency domain. Further, the inversion scheme 600 may calculate the estimates of the downgoing P and S wave data in the frequency domain which is then converted into the time domain via the Fourier transform.

Figure 7:
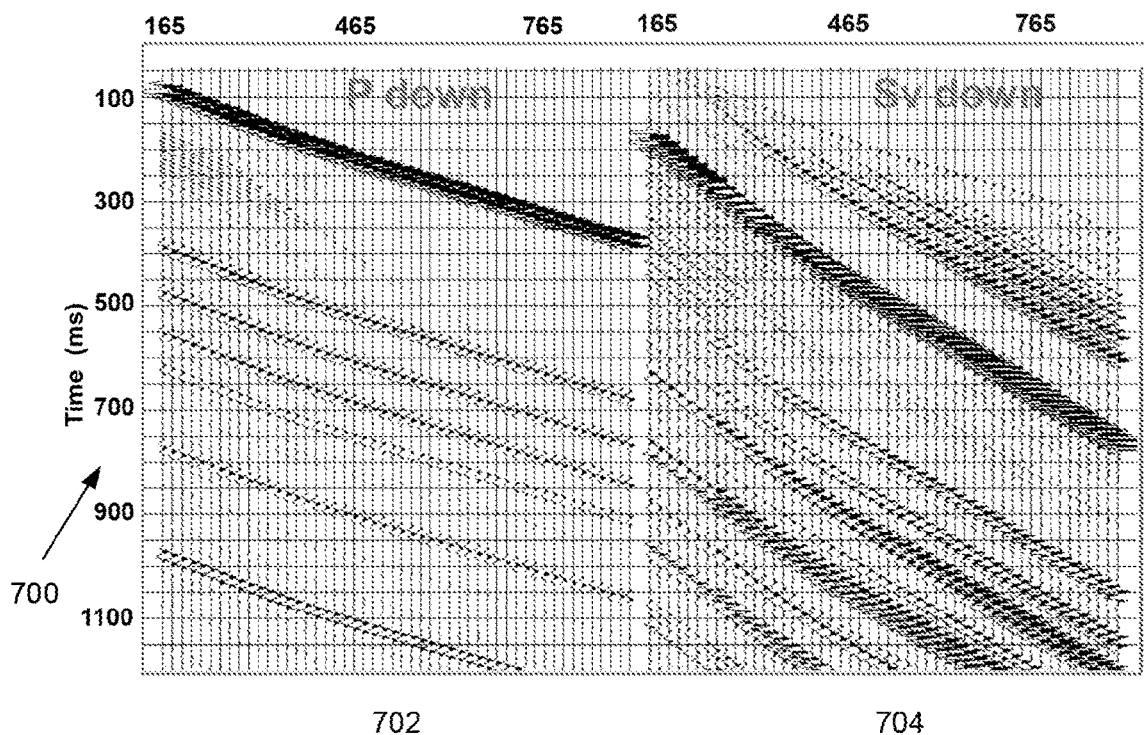
FIG. 7 illustrates example representations of the downgoing P and S wave data as a result of the wavefield separation.

FIG. 7 illustrates example representations 700 of the estimated P and S wave data in the downgoing direction as a result of the wavefield separation as a function of time and measured depth. Representation 702 illustrates the P wave data in the downgoing direction and representation 704 illustrates the S wave data in the downgoing direction. The wavefield separation identifies these P and S wave data from the P and S wave data in both an upgoing and downgoing direction shown in representation 300.

At 506, downgoing P and S wave data are rotated and adaptively subtracted from the rotated seismic wavefield data at 206. The downgoing P and S wave data may be output as scalars by the inversion process along the best fit line. In this rotation, the scalar P and S wavefield data are converted to vertical and horizontal components. The scalars indicate magnitudes of the amplitudes P and S waves. Based on the angle of emergence, the magnitudes are converted to Z, X, and/or Y components by a mathematical rotation which in one or more examples include multiplying the magnitudes by the sin and/or cos of the angle of emergence. This conversion to Z, X and/or Y components is performed in one or more examples because the data at the multicomponent receivers/geophones may be collected as recordings of the particle motions also in the Z, X, and/or Y directions.

The rotated P and S wave data may have phase and amplitude differences compared to wave modes in the seismic wavefield data. The rotated P and S wave data is then shaped prior to subtraction from the seismic wavefield data using shaping filters. The shaping may be based on the actual rotated P and S wave data which makes the subsequent subtraction of the rotated P and S wave data discussed below adaptive. A shaping filter may shift phases of the rotated P and S wave data to avoid significant energy from those downgoing P and S wave data to remain in a residual dataset, better removing the downgoing P and S wave data so that the residual dataset includes upgoing P and S wave data. The shaping filter may take a variety of forms. In a simplest, form, the shaping filter may be estimated based on a least squares fitting between the rotated downgoing P and S wave data and the seismic wavefield data. For example, an algorithm first determines a filter f via least squares estimation that minimizes the difference between (i) data d (seismic wavefield data in the time window) which is a time series and (ii) filter convolved with time series b (rotated P and S wave data). So the problem is to minimize $\|b*f-d\|^2$ where * represents convolution. Some of the better algorithms apply a regularization to this minimization problem. Once the filter has been determined (which is adaptive in nature) the b*f term is subtracted from d to get the final output of adaptive subtraction for the time series under consideration indicative of the upgoing P and S wave data. The subtraction may be on a component by component basis. For example, an X component of the filtered P wave is subtracted from the X component of the seismic wavefield data (which was rotated) to compute a difference. In another example, an Y component of the filtered P wave is subtracted from the Y component of the seismic wavefield data (which was rotated) to compute a difference. In yet another example, an Z component of the filtered P wave is subtracted from the Z component of the seismic wavefield data (which was rotated) to compute a difference.

Figure 8A:
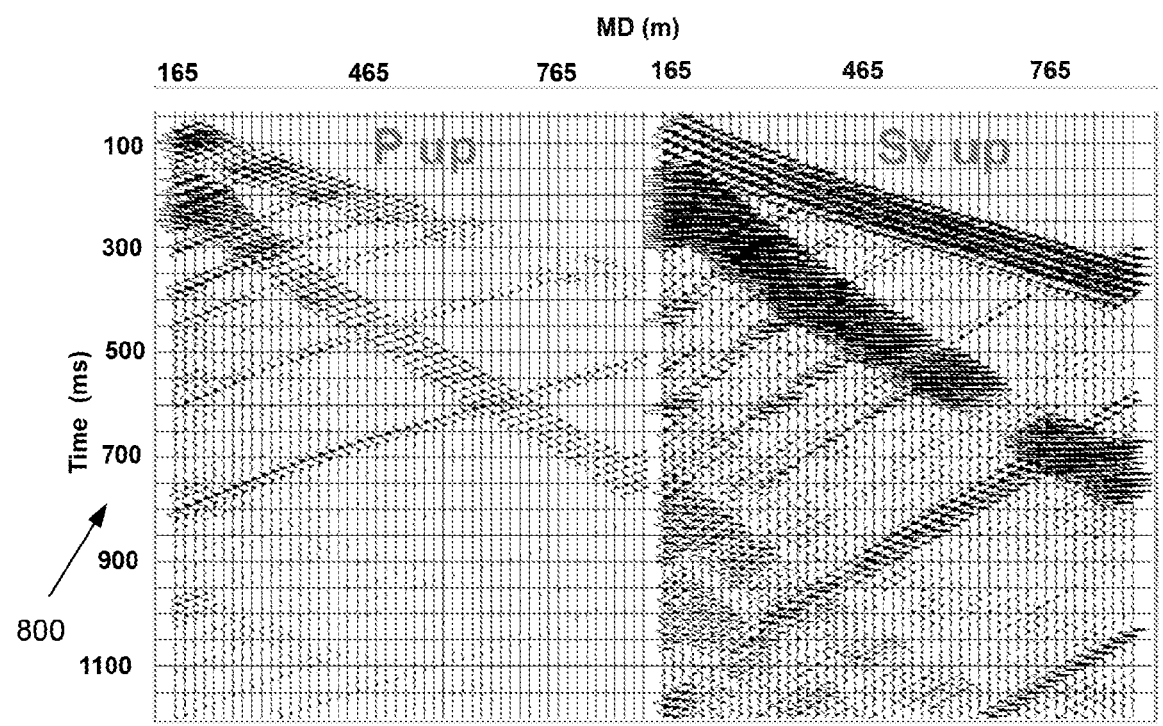
FIGS. 8A and 8B illustrate use of adaptive subtraction to remove the downgoing P and S wave data from the seismic wavefield data compared to a simple subtraction.
Figure 8B:
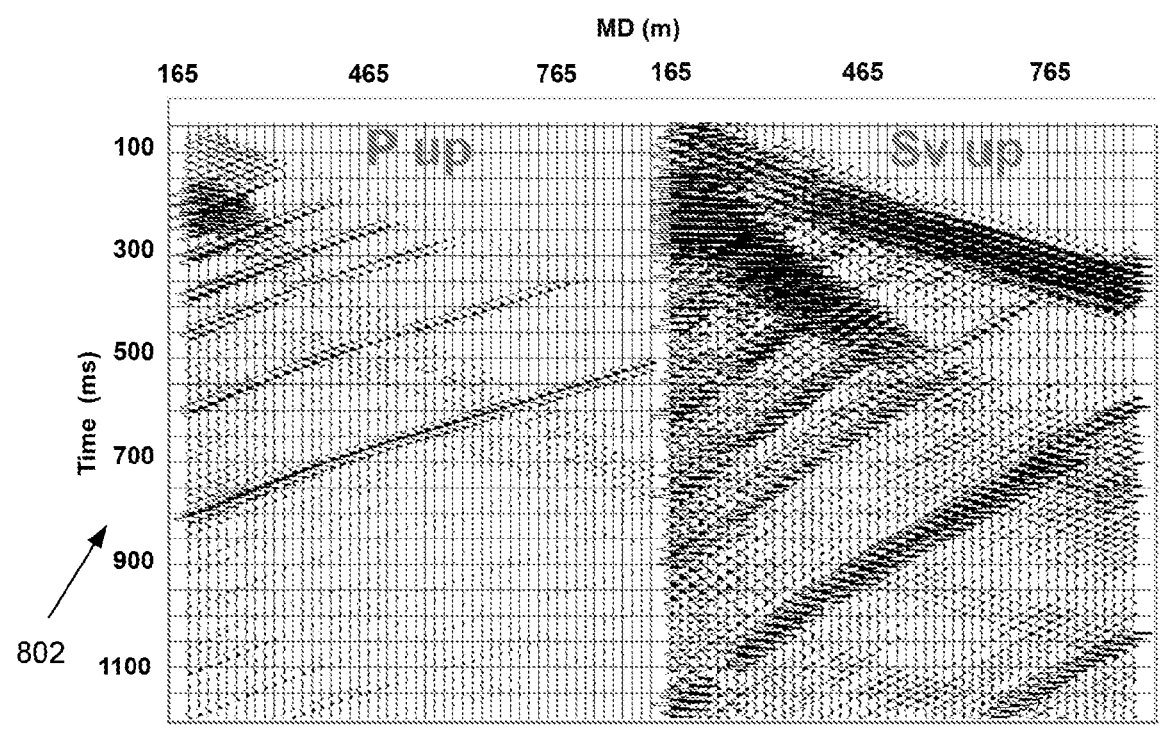

FIGS. 8A and 8B illustrate how the adaptive subtraction better removes the P and S wave data in the downgoing direction from the seismic wavefield data compared to subtraction of the downgoing P and S wave data without shaping. Representation 800 in FIG. 8A shows a residual dataset based on subtraction of the downgoing P and S wave data without shaping from the seismic wavefield data while representation 802 in FIG. 8B shows a residual dataset based on subtraction of the downgoing P and S wave data with shaping from the seismic wavefield data. The residual dataset is indicative of the upgoing P and S wave data. Representation 802 shows less remnant downgoing energy compared to representation 800. In this regard, representation 802 is a better representation of the upgoing P and S wave data compared to representation 800.

At 508, a second inversion scheme is applied to the residual dataset to decompose the residual dataset into the upgoing P and S wave data. At least a portion of the residual dataset may be input into the second inversion scheme. The portion may be associated with a receiver window shorter (e.g., 4 geophones) than the receiver window used to the determine the P and S wave data in the downgoing direction to limit mixing of waveform modes that are received. In another example, the receiver window may be longer than the receiver window used to the determine the P and S wave data in the downgoing direction to reduce noise. The second inversion scheme may operate in a manner similar to the first inversion scheme. The second inversion scheme may use the updated velocity profile in the first inversion scheme, an opposite angle of emergence to that used at 504 (indicative of upgoing P and S wave data), and the L1 norm criteria to determine the upgoing P and S wave data.

At 510, a determination is made whether the seismic wavefield data in the period of time has been processed. If not, determination of the P and S wave data in the downgoing and upgoing directions is repeated for another time window. If the seismic wavefield data in the period of time has been processed, then at 512 processing similar to 502-510 may be performed for one or more other seismic source located at different offsets from the geophones using the estimated velocity profile determined for a previous time window. For example, the steps 502-510 may be repeated for different offsets of a seismic source to the seismic receiver starting from a closest distance to a furthest distance using the velocity profile updated in earlier iterations of the inversion scheme. The processing ends when the wavefield separation for these seismic sources is complete.

Referring back to FIG. 2, at 216, the wave modes may be used to output a structural image of the geologic formation and/or reservoir characterization which can be used to control direction of drilling for hydrocarbons, among other purposes. The upgoing and downgoing P and S wave data can be used to image and characterize reservoirs in geologic formation. Imaging involves determining presence of reflectors in the geologic formation based on travel of the P and S waves. Determining locations of reflectors in the earth subsurface helps define the geometry of the reservoir. Reservoir characterization involves determining a lithology and presence of fluids in the geologic formation. For example, the P and S wave data can be used to determine P and S wave velocities ratios at various locations. These ratios are indicative of the lithology of the reservoirs and/or presence of fluids.

Example Apparatus

Figure 9:
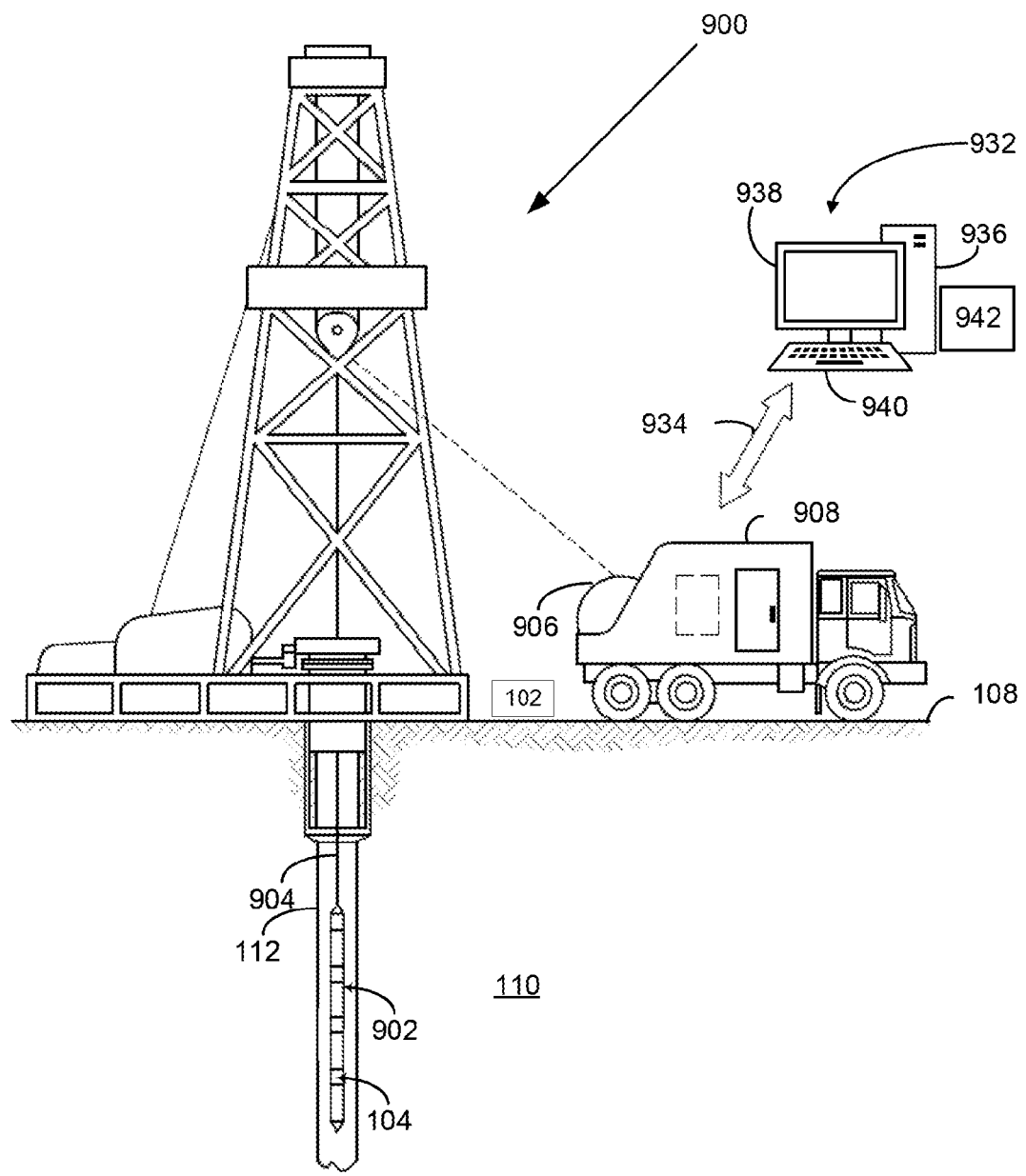
FIG. 9 illustrates use of an example wireline downhole tool for performing the seismic survey.

FIG. 9 is a schematic diagram 900 which shows a downhole tool 902 on a wireline 904. As illustrated, a wellbore 112 may extend through subterranean formation 110. It should be noted that while FIG. 9 generally depicts a land-based drilling system, those skilled in the art will readily recognize that the principles described herein are equally applicable to subsea drilling operations (not shown) that employ floating or sea-based platforms and rigs, without departing from the scope of the disclosure.

As illustrated, a hoist 906 may be used to run downhole tool 902 into the wellbore 112. Hoist 906 may be disposed on a recovery vehicle 908. Hoist 906 may be used, for example, to raise and lower wireline 904 in wellbore 112. While hoist 906 is shown on recovery vehicle 908, it should be understood that wireline 904 may alternatively be disposed from a hoist 906 that is installed at the surface 108 instead of being located on recovery vehicle 908. Downhole tool 902 may be suspended in wellbore 112 on wireline 904. Downhole tool 902 may comprise a tool body, which may be elongated as shown on FIG. 9 and have one or more seismic receivers 104 which receives seismic waves from a seismic source 102. Tool body may be any suitable material, including without limitation titanium, stainless steel, alloys, plastic, combinations thereof, and the like.

Information from downhole tool 902 such as the seismic wavefield data may be transmitted to computer system 932, which may be located at the surface 108. As illustrated, communication link 934 (which may be a wired or wireless link, for example) may be provided to transmit data, from downhole tool 902 to a computer system 932 located at the surface 108. Computer system 932 may include a processing unit 936, a monitor 938, and an input device 940 (e.g., keyboard, mouse, etc.), and/or machine readable media 942 (e.g., optical disks, magnetic disks) that can store code representative of the methods performed by the wavefield separation system 106 for determining upgoing and downgoing P and S wave data from seismic wavefield data. In addition to, or in place of processing at the surface 108, processing may occur downhole by the downhole tool 902.

Figure 10:
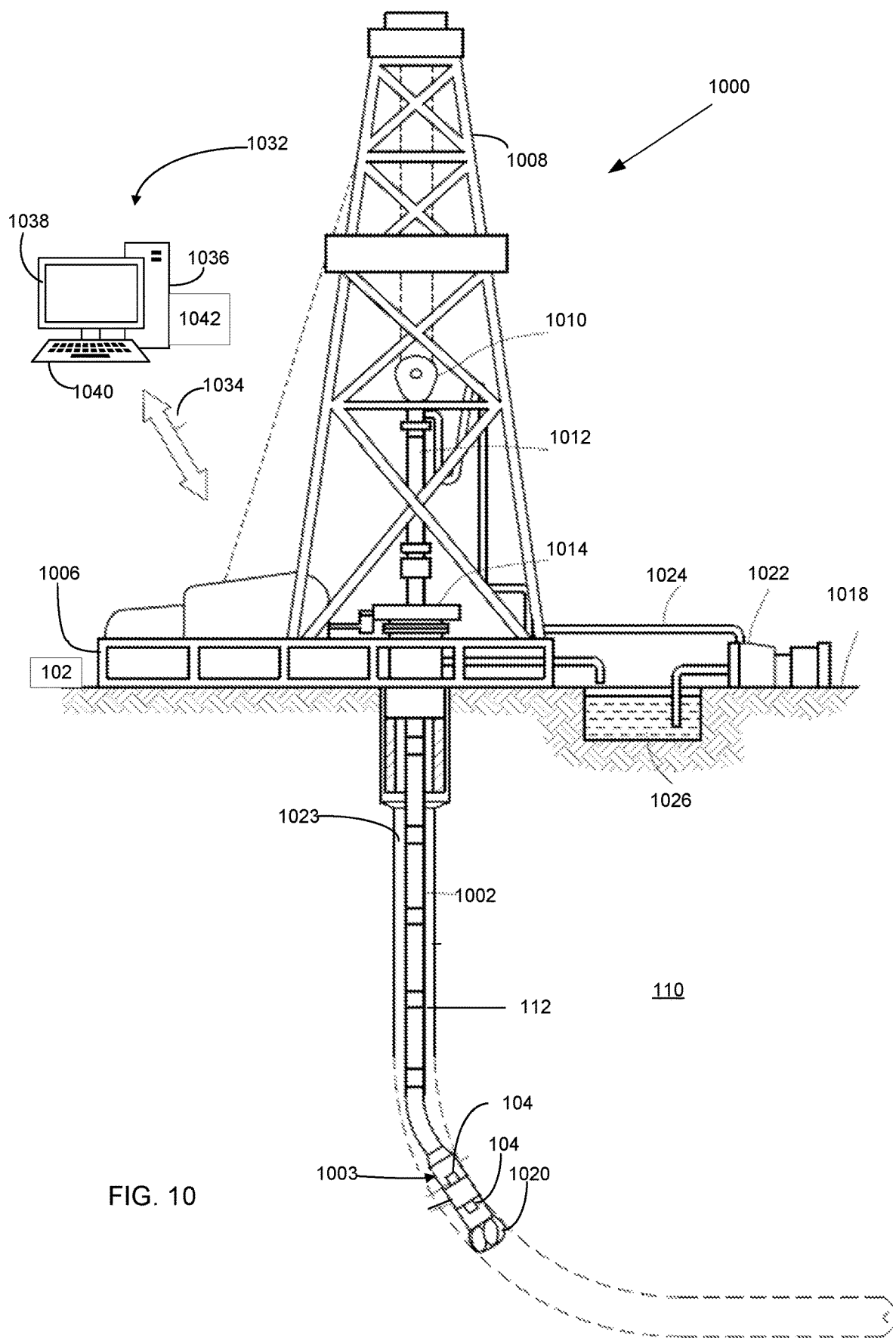
FIG. 10 illustrates use of an example logging while drilling (LWD) tool for performing the seismic survey.

FIG. 10 is a schematic diagram which shows a downhole tool 1003 disposed on a drill suing 1004 for performing logging while drilling (LWD) operations. As illustrated, a wellbore 112 may extend through subterranean formation 110. While wellbore 112 is shown extending generally vertically into the subterranean formation 110, the principles described herein are also applicable to boreholes that extend at an angle through the subterranean formation 110, such as horizontal and slanted boreholes. For example, although FIG. 10 shows a vertical or low inclination angle well, high inclination angle or horizontal placement of the well and equipment is also possible. It should further be noted that while FIG. 10 generally depicts a land-based operation, those skilled in the art will readily recognize that the principles described herein are equally applicable to subsea operations that employ floating or sea-based platforms and rigs, without departing from the scope of the disclosure.

The apparatus further includes a drilling platform 1006 that supports a derrick 1008 having a traveling block 1010 for raising and lowering drill string 1002. Drill string 1002 may include, but is not limited to, drill pipe and coiled tubing, as generally known to those skilled in the art. A kelly 1012 may support drill string 1002 as it may be lowered through a rotary table 1014. A drill bit 1020 may be attached to the distal end of drill string 1002 and may be driven either by a downhole motor and/or via rotation of drill string 1002 from the surface 1018. Without limitation, drill bit 1020 may include, roller cone bits, PDC bits, natural diamond bits, any hole openers, reamers, coring bits, and the like. As drill bit 1020 rotates, it may create and extend wellbore 112 that penetrates various subterranean formations 110. A pump 1022 may circulate drilling fluid through a feed pipe 1024 to kelly 1012, downhole through interior of drill string 1002, through orifices in drill bit 1020, back to surface 1018 via annulus 1023 surrounding drill string 1004, and into a retention pit 1026.

Drill bit 1020 may be just one piece of a downhole assembly that may include the downhole tool 1003. Downhole tool 1003 may be made of any suitable material, including without limitation titanium, stainless steel, alloys, plastic, combinations thereof, and the like and have one or more seismic receivers 104 which receives seismic waves from a seismic source 102. Information from downhole tool 1003 such as the seismic wavefield data may be transmitted to computer system 1032, which may be located at the surface 1018. As illustrated, a communication link 1034 (which may be wired or wireless, for example) may be provided that may transmit data from downhole tool 1003 to the computer system 1032 at the surface 1018. Computer system 1032 may include a processing unit 1036, a monitor 1038, an input device 1040 (e.g., keyboard, mouse, etc.), and/or machine readable media 1042 (e.g., optical disks, magnetic disks) that can store code representative of the methods performed by the wavefield separation system 106 for determining upgoing and downgoing P and S wave data from seismic wavefield data. This processing may occur at the surface 1018 in real-time. Alternatively, the processing may occur at surface 1018 or another location after withdrawal of downhole tool 1003 from wellbore 112. Still alternatively, the processing may be performed downhole in the subterranean formation 110 by the downhole tool 1003.

Figure 11:
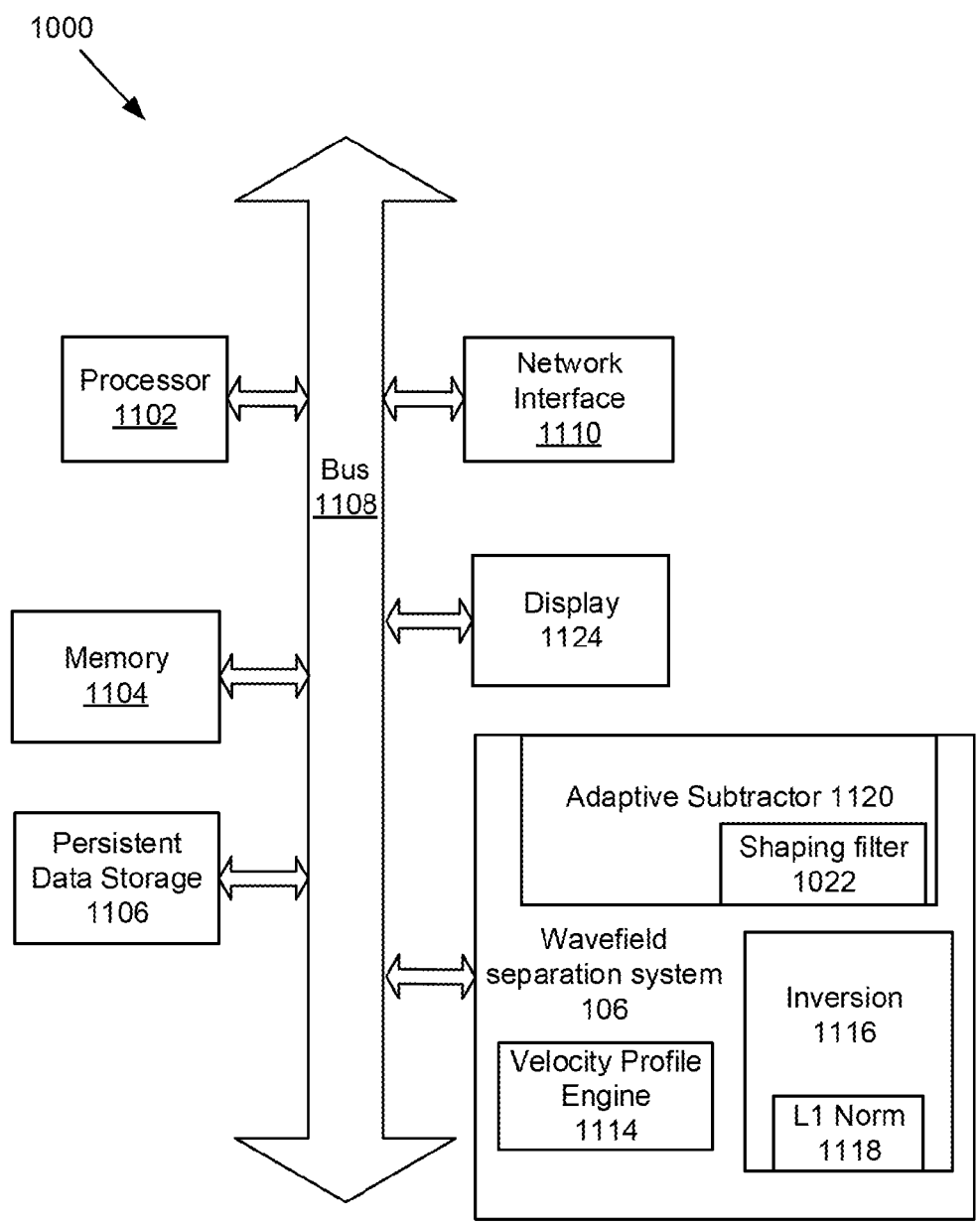
FIG. 11 is a block diagram of example apparatus for performing the seismic survey.

FIG. 11 is a block diagram of apparatus 1100 (e.g., the computer system, downhole tool, and/or wavefield separation system) for separating the seismic wavefield data into upgoing and downgoing P and S wave data. The apparatus 1100 may be located on the surface, downhole, or partially on the surface and partially downhole.

The apparatus 1100 includes a processor 1102 (possibly including multiple processors, multiple cores, multiple nodes, and/or implementing multi-threading, etc.). The apparatus 1100 includes memory 1104. The memory 1104 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable and/or computer-readable media for storing computer instructions, program code, and/or software executable by the processor 1102.

The apparatus 1100 may also include persistent data storage 1106. The persistent data storage 1106 can be a hard disk drive, such as magnetic storage device. The computer device also includes a bus 1108 (e.g., PCI, ISA, PCI-Express, etc.) and a network interface 1110 in communication with the downhole tool. The apparatus 1100 may have the wavefield separation system 106 to determine from seismic wavefield data the upgoing and downgoing P and S wave data as described above. The wavefield separation system 1112 may include a velocity profile engine 1114 for determining a velocity profile of the wellbore, an inversion 1116 which uses a model which updates the velocity profile and estimates angles of emergence based on synthetic wavefield data and seismic wavefield data meeting criteria. The criteria may be an L1 norm 1118. The wavefield separation system 1112 may determine the upgoing and downgoing P and S wave data using an adaptive subtractor 1120 and shaping filter 1122 based on the velocity profile and estimates of angles of emergence.

Further, the apparatus 1100 may further comprise a display 1124. The display 1124 may comprise a computer screen or other visual device. The display 1124 may show feedback including a graphical illustration of P and S waves in one or more of the upgoing and downgoing directions, a structural image, and/or reservoir characterization to facilitate drilling in the geologic formation.

The apparatus 1100 may implement any one of the previously described functionalities partially (or entirely) in hardware and/or software (e.g., computer code, program code, program instructions) stored on a non-transitory machine readable medium/media. In some instances, the software is executed by the processor 1102. Further, realizations can include fewer or additional components not illustrated in FIG. 11 (e.g., video cards, audio cards, additional network interfaces, peripheral devices, etc.). The processor 1102 and the memory 1104 are coupled to the bus 1108. Although illustrated as being coupled to the bus 1108, the memory 1104 can be coupled to the processor 1102.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 202-216 and/or 502-512 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit", "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for separating from seismic wavefield data upgoing and downgoing P and S wave data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1 is a method, the method comprising: positioning (i) a seismic source at the surface or below the surface of a geologic formation and (ii) a plurality of seismic receivers in a wellbore of the geologic formation; obtaining seismic wavefield data based on the seismic source outputting seismic energy into the wellbore and the plurality of seismic receivers receiving seismic waves; determining a velocity profile along the wellbore based on the seismic wavefield data; separating downgoing P (pressure) and S (shear) wave data from the seismic wavefield data based on an inversion and the velocity profile; shaping the downgoing P and S wave data based on the seismic wavefield data; subtracting the shaped downgoing P and S wave data from the seismic wavefield data to form residual wavefield data; separating upgoing P and S wave data from the residual wavefield data based on the inversion and an updated velocity profile; and outputting the upgoing and downgoing P and S wave data. The inversion as described in Embodiment 1 comprises calculating an absolute value difference between synthetic wavefield data output by a modelling engine of the inversion and the seismic wavefield data. The shaping of the P and S wave data as described in any of the preceding embodiments comprises filtering the downgoing P and S wave data with a shaping filter based on a least squares fitting between the downgoing P and S wave data and the seismic wavefield data. The wellbore as described in any of the preceding embodiments is deviated, and wherein determining the velocity profile along the wellbore comprises determining a travel time of first breaks along a portion of the wellbore. Separating the upgoing and downgoing P and S wave data as described in any of the preceding embodiments comprises dividing the seismic wavefield data into time windows and separating the upgoing and downgoing P and S wave data in each of the time windows. The inversion as described in any of the preceding embodiments comprises a modelling engine which outputs synthetic wavefield data based on the velocity profile and an angle of emergence of the seismic energy. Separating the downgoing P and S wave data as described in any of the preceding embodiments comprises updating the velocity profile and angle of emergence based on the inversion and wherein separating the upgoing P and S wave data comprises separating the upgoing P and S wave data based on the updated velocity profile and the angle of emergence. Outputting the upgoing and downgoing P and S wave data as described in any of the preceding embodiments comprises one or more of structurally imaging the geologic formation and characterizing a reservoir based on the upgoing and downgoing P and S wave data.

Embodiment 2 is a system, the system comprising: a seismic source positioned at the surface or below the surface of a geologic formation; a plurality of seismic receivers positioned in a wellbore of the geologic formation; computer instructions stored in memory an executable by a processor for performing the functions of: obtaining seismic wavefield data based on the seismic source outputting seismic energy into the wellbore and the plurality of seismic receivers receiving seismic waves; determining a velocity profile along the wellbore based on the seismic wavefield data; separating downgoing P and S wave data from the seismic wavefield data based on an inversion and the velocity profile; shaping the downgoing P and S wave data based on the seismic wavefield data; subtracting the shaped downgoing P and S wave data from the seismic wavefield data to form residual wavefield data; separating upgoing P and S wave data from the residual wavefield data based on the inversion and an updated velocity profile; and outputting the upgoing and downgoing P and S wave data. The inversion as described in Embodiment 2 comprises calculating an absolute value difference between synthetic wavefield data output by a modelling engine of the inversion and the seismic wavefield data. The computer instructions to subtract the shaped P and S wave data as described in any of the preceding embodiments of Embodiment 2 comprises computer instructions to filter the downgoing P and S wave data with a shaping filter based on a least squares fitting between the downgoing P and S wave data and the seismic wavefield data. The wellbore as described in any of the preceding embodiments of Embodiment 2 is deviated, and wherein the computer instructions to determine the velocity profile along the wellbore comprises computer instructions to determine a travel time of first breaks along a portion of the wellbore. The computer instructions to separate the upgoing and downgoing P and S wave data as described in any of the preceding embodiments of Embodiment 2 comprises computer instructions to divide the seismic wavefield data into time windows and separating the upgoing and downgoing P and S wave data in each of the time windows. The inversion as described in any of the preceding embodiments of Embodiment 2 comprises a modelling engine which outputs synthetic wavefield data based on the velocity profile and an angle of emergence of the seismic energy. The computer instructions to separate the downgoing P and S wave data as described in any of the preceding embodiments of Embodiment 2 comprises computer instructions to update the velocity profile and angle of emergence based on the inversion and wherein the computer instructions to separate the upgoing P and S wave data comprises computer instructions to separate the upgoing P and S wave data based on the updated velocity profile and the angle of emergence. The computer instructions to output the upgoing and downgoing P and S wave data as described in any of the preceding embodiments of Embodiment 2 computer instructions for one or more of structurally imaging the geologic formation and characterizing a reservoir based on the upgoing and downgoing P and S wave data Embodiment 3 is a non-transitory computer readable media comprising computer instructions for performing the functions of: obtaining seismic wavefield data based on (i) a seismic source positioned at a surface or below the surface of a geologic formation outputting seismic energy into a wellbore and (ii) plurality of seismic receivers in the wellbore of the geologic formation receiving seismic waves; determining a velocity profile along the wellbore based on the seismic wavefield data; separating downgoing P and S wave data from the seismic wavefield data based on an inversion and the velocity profile; shaping the downgoing P and S wave data based on the seismic wavefield data; subtracting the shaped downgoing P and S wave data from the seismic wavefield data to form residual wavefield data; separating upgoing P and S wave data from the residual wavefield data based on the inversion and an updated velocity profile; and outputting the upgoing and downgoing P and S wave data. The inversion as described in Embodiment 3 comprises calculating an absolute value difference between synthetic wavefield data output by a modelling engine of the inversion and the seismic wavefield data. The computer instructions to subtract the shaped P and S wave data as described in any of the preceding embodiments of Embodiment 3 comprises computer instructions to filter the downgoing P and S wave data with a shaping filter based on a least squares fitting between the downgoing P and S wave data and the seismic wavefield data. The computer instructions to separate the downgoing P and S wave data as described in any of the preceding embodiments of Embodiment 3 comprises computer instructions to update the velocity profile and angle of emergence based on the inversion and wherein the computer instructions to separate the upgoing P and S wave data comprises computer instructions to separate the upgoing P and S wave data based on the updated velocity profile and angle of emergence.

What is claimed is:
1. A method comprising:
 positioning (i) a seismic source at the surface or below the surface of a geologic formation and (ii) a plurality of seismic receivers in a wellbore of the geologic formation;
 obtaining seismic wavefield data based on the seismic source outputting seismic energy into the wellbore and the plurality of seismic receivers receiving seismic waves;
 determining a velocity profile along the wellbore based on the seismic wavefield data;

separating downgoing P and S wave data from the seismic wavefield data based on an inversion and the velocity profile;
rotating the downgoing P and S wave data;
shaping the rotated downgoing P and S wave data based on the seismic wavefield data;
subtracting the shaped downgoing P and S wave data from the seismic wavefield data to form residual wavefield data;
separating upgoing P and S wave data from the residual wavefield data based on the inversion and an updated velocity profile; and
outputting the upgoing and downgoing P and S wave data.

2. The method of claim 1, wherein the inversion comprises calculating an absolute value difference between synthetic wavefield data output by a modelling engine of the inversion and the seismic wavefield data.

3. The method of claim 1, wherein shaping the downgoing P and S wave data comprises filtering the downgoing P and S wave data with a shaping filter based on a least squares fitting between the downgoing P and S wave data and the seismic wavefield data.

4. The method of claim 1, wherein the wellbore is deviated, and wherein determining the velocity profile along the wellbore comprises determining a travel time of first breaks along a portion of the wellbore.

5. The method of claim 1, wherein separating the upgoing and downgoing P and S wave data comprises dividing the seismic wavefield data into time windows and separating the upgoing and downgoing P and S wave data in each of the time windows.

6. The method of claim 1, wherein the inversion comprises a modelling engine which outputs synthetic wavefield data based on the velocity profile and an angle of emergence of the seismic energy.

7. The method of claim 1, wherein separating the downgoing P and S wave data comprises updating the velocity profile and angle of emergence based on the inversion and wherein separating the upgoing P and S wave data comprises separating the upgoing P and S wave data based on the updated velocity profile and the angle of emergence.

8. The method of claim 1, wherein outputting the upgoing and downgoing P and S wave data comprises one or more of structurally imaging the geologic formation and characterizing a reservoir based on the upgoing and downgoing P and S wave data.

9. A system comprising:
a seismic source positioned at the surface or below the surface of a geologic formation;
a plurality of seismic receivers positioned in a wellbore of the geologic formation;
computer instructions stored in memory an executable by a processor for performing the functions of:
obtaining seismic wavefield data based on the seismic source outputting seismic energy into the wellbore and the plurality of seismic receivers receiving seismic waves;
determining a velocity profile along the wellbore based on the seismic wavefield data;
separating downgoing P and S wave data from the seismic wavefield data based on an inversion and the velocity profile;
rotating the downgoing P and S wave data;
shaping the rotated downgoing P and S wave data based on the seismic wavefield data;
subtracting the shaped downgoing P and S wave data from the seismic wavefield data to form residual wavefield data;
separating upgoing P and S wave data from the residual wavefield data based on the inversion and an updated velocity profile; and
outputting the upgoing and downgoing P and S wave data.

10. The system of claim 9, wherein the inversion comprises calculating an absolute value difference between synthetic wavefield data output by a modelling engine of the inversion and the seismic wavefield data.

11. The system of claim 9, wherein the computer instructions to shape the downgoing P and S wave data comprises computer instructions to filter the downgoing P and S wave data with a shaping filter based on a least squares fitting between the downgoing P and S wave data and the seismic wavefield data.

12. The system of claim 9, wherein the wellbore is deviated, and wherein the computer instructions to determine the velocity profile along the wellbore comprises computer instructions to determine a travel time of first breaks along a portion of the wellbore.

13. The system of claim 9, wherein the computer instructions to separate the upgoing and downgoing P and S wave data comprises computer instructions to divide the seismic wavefield data into time windows and separating the upgoing and downgoing P and S wave data in each of the time windows.

14. The system of claim 9, wherein the inversion comprises a modelling engine which outputs synthetic wavefield data based on the velocity profile and an angle of emergence of the seismic energy.

15. The system of claim 9, wherein the computer instructions to separate the downgoing P and S wave data comprises computer instructions to update the velocity profile and angle of emergence based on the inversion and wherein the computer instructions to separate the upgoing P and S wave data comprises computer instructions to separate the upgoing P and S wave data based on the updated velocity profile and the angle of emergence.

16. The system of claim 9, wherein the computer instructions to output the upgoing and downgoing P and S wave data computer instructions for one or more of structurally imaging the geologic formation and characterizing a reservoir based on the upgoing and downgoing P and S wave data.

17. A non-transitory computer readable media comprising computer instructions for performing the functions of:
obtaining seismic wavefield data based on (i) a seismic source positioned at a surface or below the surface of a geologic formation outputting seismic energy into a wellbore and (ii) a plurality of seismic receivers in the wellbore of the geologic formation receiving seismic waves;
determining a velocity profile along the wellbore based on the seismic wavefield data;
separating downgoing P and S wave data from the seismic wavefield data based on an inversion and the velocity profile;
rotating the downgoing P and S wave data;
shaping the rotated downgoing P and S wave data based on the seismic wavefield data;
subtracting the shaped downgoing P and S wave data from the seismic wavefield data to form residual wavefield data;

separating upgoing P and S wave data from the residual wavefield data based on the inversion and an updated velocity profile; and outputting the upgoing and downgoing P and S wave data.

18. The non-transitory computer readable media of claim 17, wherein the inversion comprises calculating an absolute value difference between synthetic wavefield data output by a modelling engine of the inversion and the seismic wavefield data.

19. The non-transitory computer readable media of claim 17, wherein the computer instructions to shape the downgoing P and S wave data comprises computer instructions to filter the downgoing P and S wave data with a shaping filter based on a least squares fitting between the downgoing P and S wave data and the seismic wavefield data.

20. The non-transitory computer readable media of claim 17, wherein the computer instructions to separate the downgoing P and S wave data comprises computer instructions to update the velocity profile and angle of emergence based on the inversion and wherein the computer instructions to separate the upgoing P and S wave data comprises computer instructions to separate the upgoing P and S wave data based on the updated velocity profile and angle of emergence.

\* \* \* \* \*